(12) United States Patent
Bruns (10) Patent No.: US 9,658,006 B1
(45) Date of Patent: May 23, 2017

(54) DEVICES AND SYSTEMS FOR THERMAL MANAGEMENT

(71) Applicant: X Development LLC, Mountain View, CA (US)

(72) Inventor: Richard Chad Bruns, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 212 days.

(21) Appl. No.: 14/687,137

(22) Filed: Apr. 15, 2015

(51) Int. Cl.
| F28F 13/18 | (2006.01) |
| F28F 21/08 | (2006.01) |
| B64B 1/58 | (2006.01) |
| B64D 45/00 | (2006.01) |

(52) U.S. Cl.
CPC .............. *F28F 21/084* (2013.01); *B64B 1/58* (2013.01); *B64D 45/00* (2013.01)

(58) Field of Classification Search
CPC . F28F 21/084; B64B 1/58; B64B 1/60; B64B 1/62; B64D 45/00; H05K 7/2039; H05K 7/20409
USPC ....................................................... 165/133
See application file for complete search history.

(56) References Cited

U.S. PATENT DOCUMENTS

| 3,260,480 A * | 7/1966 | Ash ........................... B64B 1/62 |
| | | 244/31 |
| 4,254,357 A * | 3/1981 | Haas ....................... H01J 23/04 |
| | | 313/107 |
| 6,073,887 A | 6/2000 | Hosick |
| 6,119,979 A * | 9/2000 | Lee ........................... B64B 1/44 |
| | | 244/61 |
| 6,425,552 B1 | 7/2002 | Lee et al. |
| 7,438,261 B2 | 10/2008 | Porter |
| 7,469,857 B2 | 12/2008 | Voss |
| 8,804,228 B1 | 8/2014 | Biffle et al. |
| 2002/0130220 A1* | 9/2002 | Sparks ...................... B64B 1/30 |
| | | 244/128 |
| 2006/0000945 A1* | 1/2006 | Voss .......................... B64B 1/60 |
| | | 244/97 |

OTHER PUBLICATIONS

Grena, R., "Solar Balloons as mixed solar-wind power systems," Solar Energy, vol. 88, p. 215-226 (2013).

* cited by examiner

*Primary Examiner* — Davis Hwu
(74) *Attorney, Agent, or Firm* — McDonnell Boehnen Hulbert & Berghoff LLP (57) ABSTRACT

Systems and devices may include a thermal management device that includes a high emissivity material. The high emissivity material is configured to have a high emissivity with respect to wavelengths of electromagnetic radiation in a thermal infrared spectrum. The thermal management device is arrangeable on a surface of a component of a stratospheric aerial vehicle. The thermal management device is configured such that when arranged on the component of the stratospheric aerial vehicle during flight, a first side of the thermal management device faces substantially upward with respect to ground, and the second side of the thermal management device faces substantially downward with respect to the ground. The second side is shaped to retain air that is warmer than an ambient air temperature at a stratospheric altitude.

20 Claims, 7 Drawing Sheets

Top Oblique View

Cross-Sectional View

Figure 5

DEVICES AND SYSTEMS FOR THERMAL MANAGEMENT

BACKGROUND

Unless otherwise indicated herein, the materials described in this section are not prior art to the claims in this application and are not admitted to be prior art by inclusion in this section.

Computing devices such as personal computers, laptop computers, tablet computers, smartphones, wearable computing devices, and countless types of Internet-capable devices are increasingly prevalent in numerous aspects of modern life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

SUMMARY

In a first aspect, a thermal management device is provided. The thermal management device includes a first side, a second side, and a high emissivity material disposed on at least a portion of the second side. The high emissivity material is configured to have a high emissivity with respect to wavelengths of electromagnetic radiation in a thermal infrared spectrum. The thermal management device is arrangeable on a surface of a component of a stratospheric aerial vehicle. The thermal management device is configured such that when arranged on the component of the stratospheric aerial vehicle during flight, the first side faces substantially upward with respect to ground, and the second side faces substantially downward with respect to the ground. The second side is shaped to retain air that is warmer than an ambient air temperature at a stratospheric altitude.

In a second aspect, a system is provided. The system includes a temperature-sensitive device configured to operate within a target temperature range and a thermal management device arranged on a surface of the temperature-sensitive device such that the thermal management device thermally couples to the temperature-sensitive device. The temperature-sensitive device includes a component of a stratospheric aerial vehicle. The thermal management device includes a first side and a second side. The first side faces substantially upward with respect to ground, and the second side faces substantially downward with respect to the ground. The thermal management device includes a high emissivity material disposed on at least a portion of the second side. The high emissivity material is configured to have a high emissivity with respect to wavelengths of electromagnetic radiation in a thermal infrared spectrum, and the second side is shaped to retain warm air that is warmer than an ambient air temperature at a stratospheric altitude, such that the thermal management device is configured to heat and cool the temperature-sensitive device such that the temperature-sensitive device operates within a target temperature range.

These as well as other aspects, advantages, and alternatives, will become apparent to those of ordinary skill in the art by reading the following detailed description, with reference where appropriate to the accompanying drawings.

DETAILED DESCRIPTION

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an example embodiment may include elements that are not illustrated in the Figures.

1. Overview

In the stratosphere (e.g. at an altitude of around 10 km or greater), the air temperature is generally be between $-80°$ C. to $-50°$ C. At such altitudes, the density of air may vary between near-zero and 25% of the air density at sea level. For example, at around 20 km, the density of air may be approximately 7% of the density of air at sea level. Under such conditions, a balloon, a high-altitude drone, or another type of aerial vehicle may include components that need additional heat to perform properly, and/or to maintain long-term cycle performance. For example, an electronic component may have a low temperature specification of $-40°$ C. or higher.

In some scenarios, additional heat may be provided by one or more electrical heaters. For example, during the day, solar panels may be configured to provide electrical power to heaters to keep components warm. However, at night, the electrical power needed for such a heater may be need to be provided by a battery.

Heat loss to the environment may be reduced by using thermally-insulating materials. When high-altitude aerial vehicle components are active, some components may generate enough heat to need cooling or other heat management. In some cases, excessive heat may build up when the components are on, particularly during the day. Under such conditions, insulation may adversely increase heat retention and lead to excessive component temperatures.

Because of the above considerations, and because high-altitude aerial vehicles may be configured to stay aloft for long time periods without servicing, a need exists for effective, inexpensive, and lightweight thermal management approaches. Accordingly, example embodiments may provide thermal management approaches that help to both: a) heat components of a high-altitude aerial vehicle, especially at night; and b) allow heat dissipation of hot components during operation, without requiring regular service (or at least reducing the amount of and/or frequency of regular service that is required).

The present disclosure may relate to systems and methods for temperature management of high-altitude aerial vehicles. Specifically, by controlling the emissivity of various surfaces of the high-altitude aerial vehicle, the temperature of the components of the high-altitude aerial vehicle may be better controlled.

In an example embodiment, an upward-facing surface of a thermal management device may include a low-emissivity material, such as metallized Mylar, metallized boPET, or metallized foil tape. Downward-facing surfaces of the device may include high-emissivity material, such as white paint, a selective black coating, or a second surface mirror. In one specific embodiment, the high-emissivity material may have a broadband emissivity of 0.92 and an absorptivity of 0.25. Other materials, which may have different values for wavelength-dependent emissivity and absorptivity, are contemplated herein. In an example embodiment, the solar absorptivity of the downward-facing surfaces of the device may be reduced or minimized in an effort to lessen the thermal effect of absorbed sunlight reflected from the Earth during daytime.

Other materials are possible for the upward- and downward-facing surfaces of the device. For example, the downward-facing surfaces may include a material configured to have high thermal emissivity but high sunlight (visible/UV) reflectance. Furthermore, the downward-facing surface may include a clear anodized coating over bare metal. In some cases, the thermal management device need not have a separate material on top of the upward-facing surface. For example, a highly-polished surface of an aluminum plate may act as an efficient reflector of sunlight while emitting infrared heat minimally.

Furthermore, the thermal management device may be shaped to reduce and possibly minimize convection, or convective heat transfer. More specifically, convective heat transfer involves warm air rising relative to ambient air because warm air is less dense than the relatively cooler ambient air. Convection may therefore be prevented if the warm air is trapped or retained, e.g. by preventing it from rising. Thus, the thermal management device may include a substantially horizontal surface, which may be useful to prevent warm air from rising from beneath an underside of the horizontal surface.

In an example embodiment, the thermal management device may include a circular plate. The downward-facing surface of the plate may include a shape configured to trap or retain warm air. For example, the shape of the downward-facing surface may have an outer rim that may protrude further downward than the central portion of the downward-facing surface. Other shapes are possible. For example, the downward-facing surface may include a plurality of pockets, dimples, slots, and/or concave portions which may be configured to retain warm air as it rises with respect to the cooler air around the balloon or another type of high-altitude aerial vehicle.

2. Example Balloon Networks

Figure 1:
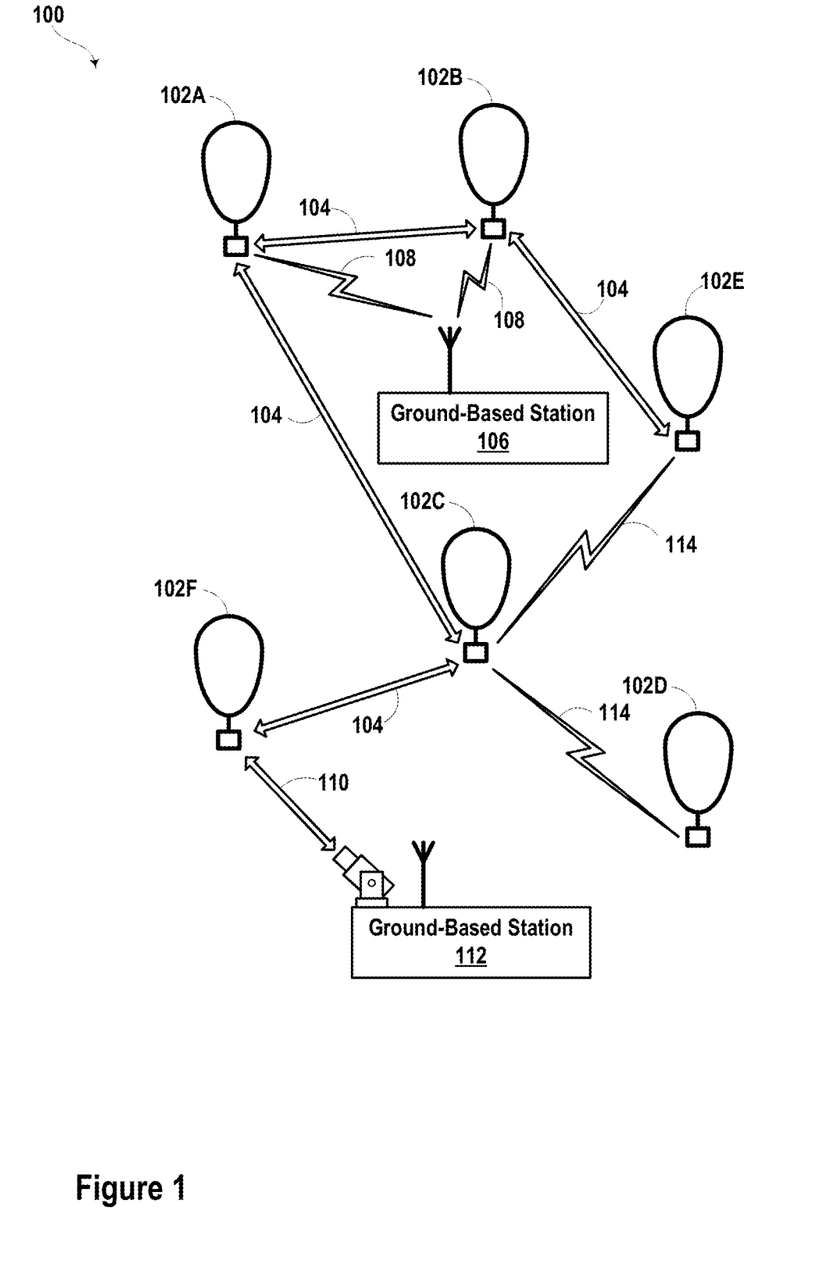
FIG. 1 is a simplified block diagram illustrating a balloon network, according to an example embodiment.

FIG. 1 is a simplified block diagram illustrating a balloon network 100, according to an example embodiment. As shown, balloon network 100 includes balloons 102A to 102F, which are configured to communicate with one another via free-space optical links 104. Balloons 102A to 102F could additionally or alternatively be configured to communicate with one another via RF links 114. Balloons 102A to 102F may collectively function as a mesh network for packet-data communications. Further, at least some of balloons 102A and 102B may be configured for RF communications with ground-based stations 106 and 112 via respective RF links 108. Further, some balloons, such as balloon 102F, could be configured to communicate via optical link 110 with ground-based station 112.

In an example embodiment, balloons 102A to 102F are high-altitude balloons, which are deployed in the stratosphere. At moderate latitudes, the stratosphere includes altitudes between approximately 10 kilometers (km) and 50 km altitude above the surface. At the poles, the stratosphere starts at an altitude of approximately 8 km. In an example embodiment, high-altitude balloons may be generally configured to operate in an altitude range within the stratosphere that has relatively low wind speed (e.g., between 5 and 20 miles per hour (mph)).

More specifically, in a high-altitude-balloon network, balloons 102A to 102F may generally be configured to operate at altitudes between 18 km and 25 km (although other altitudes are possible). This altitude range may be advantageous for several reasons. In particular, this layer of the stratosphere generally has relatively low wind speeds (e.g., winds between 5 and 20 mph) and relatively little turbulence. Further, while the winds between 18 km and 25 km may vary with latitude and by season, the variations can be modeled in a reasonably accurate manner. Additionally, altitudes above 18 km are typically above the maximum flight level designated for commercial air traffic. Therefore, interference with commercial flights is not a concern when balloons are deployed between 18 km and 25 km.

To transmit data to another balloon, a given balloon 102A to 102F may be configured to transmit an optical signal via an optical link 104. In an example embodiment, a given balloon 102A to 102F may use one or more high-power light-emitting diodes (LEDs) to transmit an optical signal. Alternatively, some or all of balloons 102A to 102F may include laser systems for free-space optical communications over optical links 104. Other types of free-space optical communication are possible. Further, in order to receive an optical signal from another balloon via an optical link 104, a given balloon 102A to 102F may include one or more optical receivers. Additional details of example balloons are discussed in greater detail below, with reference to FIG. 3.

In a further aspect, balloons 102A to 102F may utilize one or more of various different RF air-interface protocols for communication with ground-based stations 106 and 112 via respective RF links 108. For instance, some or all of balloons 102A to 102F may be configured to communicate with ground-based stations 106 and 112 using protocols described in IEEE 802.11 (including any of the IEEE 802.11 revisions), various cellular protocols such as GSM, CDMA, UMTS, EV-DO, WiMAX, and/or LTE, and/or one or more propriety protocols developed for balloon-ground RF communication, among other possibilities.

In a further aspect, there may be scenarios where RF links 108 do not provide a desired link capacity for balloon-to-ground communications. For instance, increased capacity may be desirable to provide backhaul links from a ground-based gateway, and in other scenarios as well. Accordingly, an example network may also include downlink balloons, which could provide a high-capacity air-ground link.

For example, in balloon network 100, balloon 102F is configured as a downlink balloon. Like other balloons in an example network, a downlink balloon 102F may be operable for optical communication with other balloons via optical links 104. However, a downlink balloon 102F may also be configured for free-space optical communication with a ground-based station 112 via an optical link 110. Optical link 110 may therefore serve as a high-capacity link (as compared to an RF link 108) between the balloon network 100 and the ground-based station 112.

Note that in some implementations, a downlink balloon 102F may additionally be operable for RF communication with ground-based stations 106. In other cases, a downlink balloon 102F may only use an optical link for balloon-to-ground communications. Further, while the arrangement shown in FIG. 1 includes just one downlink balloon 102F, an example balloon network can also include multiple downlink balloons. On the other hand, a balloon network can also be implemented without any downlink balloons.

In other implementations, a downlink balloon may be equipped with a specialized, high-bandwidth RF communication system for balloon-to-ground communications, instead of, or in addition to, a free-space optical communication system. The high-bandwidth RF communication system may take the form of an ultra-wideband system, which may provide an RF link with substantially the same capacity as one of the optical links 104. Other forms are also possible.

Ground-based stations, such as ground-based stations 106 and/or 112, may take various forms. Generally, a ground-based station may include components such as transceivers, transmitters, and/or receivers for communication via RF links and/or optical links with a balloon network. Further, a ground-based station may use various air-interface protocols in order to communicate with a balloon 102A to 102F over an RF link 108. As such, ground-based stations 106 and 112 may be configured as an access point via which various devices can connect to balloon network 100. Ground-based stations 106 and 112 may have other configurations and/or serve other purposes without departing from the scope of the invention.

In a further aspect, some or all of balloons 102A to 102F could be configured to establish a communication link with space-based satellites in addition to, or as an alternative to, a ground-based communication link. In some embodiments, a balloon may communicate with a satellite via an optical link. However, other types of satellite communications are possible.

Further, some ground-based stations, such as ground-based stations 106 and 112, may be configured as gateways between balloon network 100 and one or more other networks. Such ground-based stations 106 and 112 may thus serve as an interface between the balloon network and the Internet, a cellular service provider's network, and/or other types of networks. Variations on this configuration and other configurations of ground-based stations 106 and 112 are also possible.

2a) Mesh Network Functionality

As noted, balloons 102A to 102F may collectively function as a mesh network. More specifically, since balloons 102A to 102F may communicate with one another using free-space optical links, the balloons may collectively function as a free-space optical mesh network.

In a mesh-network configuration, each balloon 102A to 102F may function as a node of the mesh network, which is operable to receive data directed to it and to route data to other balloons. As such, data may be routed from a source balloon to a destination balloon by determining an appropriate sequence of optical links between the source balloon and the destination balloon. These optical links may be collectively referred to as a "lightpath" for the connection between the source and destination balloons. Further, each of the optical links may be referred to as a "hop" on the lightpath.

To operate as a mesh network, balloons 102A to 102F may employ various routing techniques and self-healing algorithms. In some embodiments, a balloon network 100 may employ adaptive or dynamic routing, where a lightpath between a source and destination balloon is determined and set-up when the connection is needed, and released at a later time. Further, when adaptive routing is used, the lightpath may be determined dynamically depending upon the current state, past state, and/or predicted state of the balloon network.

In addition, the network topology may change as the balloons 102A to 102F move relative to one another and/or relative to the ground. Accordingly, an example balloon network 100 may apply a mesh protocol to update the state of the network as the topology of the network changes. For example, to address the mobility of the balloons 102A to 102F, balloon network 100 may employ and/or adapt various techniques that are employed in mobile ad hoc networks (MANETs). Other examples are possible as well.

In some implementations, a balloon network 100 may be configured as a transparent mesh network. More specifically, in a transparent balloon network, the balloons may include components for physical switching that is entirely optical, without any electrical components involved in the physical routing of optical signals. Thus, in a transparent configuration with optical switching, signals travel through a multi-hop lightpath that is entirely optical.

In other implementations, the balloon network 100 may implement a free-space optical mesh network that is opaque. In an opaque configuration, some or all balloons 102A to 102F may implement optical-electrical-optical (OEO) switching. For example, some or all balloons may include optical cross-connects (OXCs) for OEO conversion of optical signals. Other opaque configurations are also possible. Additionally, network configurations are possible that include routing paths with both transparent and opaque sections.

In a further aspect, balloons in an example balloon network 100 may implement wavelength division multiplexing (WDM), which may help to increase link capacity. When WDM is implemented with transparent switching, physical lightpaths through the balloon network may be subject to the "wavelength continuity constraint." More specifically, because the switching in a transparent network is entirely optical, it may be necessary to assign the same wavelength for all optical links on a given lightpath.

An opaque configuration, on the other hand, may avoid the wavelength continuity constraint. In particular, balloons in an opaque balloon network may include the OEO switching systems operable for wavelength conversion. As a result, balloons can convert the wavelength of an optical signal at each hop along a lightpath. Alternatively, optical wavelength conversion could take place at only selected hops along the lightpath.

Further, various routing algorithms may be employed in an opaque configuration. For example, to determine a primary lightpath and/or one or more diverse backup lightpaths for a given connection, example balloons may apply or consider shortest-path routing techniques such as Dijkstra's algorithm and k-shortest path, and/or edge and node-diverse or disjoint routing such as Suurballe's algorithm, among others. Additionally or alternatively, techniques for maintaining a particular quality of service (QoS) may be employed when determining a lightpath. Other techniques are also possible.

2b) Station-Keeping Functionality

In an example embodiment, a balloon network 100 may implement station-keeping functions to help provide a desired network topology. For example, station-keeping may involve each balloon 102A to 102F maintaining and/or moving into a certain position relative to one or more other balloons in the network (and possibly in a certain position relative to the ground). As part of this process, each balloon 102A to 102F may implement station-keeping functions to determine its desired positioning within the desired topology, and if necessary, to determine how to move to the desired position.

The desired topology may vary depending upon the particular implementation. In some cases, balloons may implement station-keeping to provide a substantially uniform topology. In such cases, a given balloon 102A to 102F may implement station-keeping functions to position itself at substantially the same distance (or within a certain range of distances) from adjacent balloons in the balloon network 100.

In other cases, a balloon network 100 may have a non-uniform topology. For instance, example embodiments may involve topologies where balloons are distributed more or less densely in certain areas, for various reasons. As an example, to help meet the higher bandwidth demands that are typical in urban areas, balloons may be clustered more densely over urban areas. For similar reasons, the distribution of balloons may be denser over land than over large bodies of water. Many other examples of non-uniform topologies are possible.

In a further aspect, the topology of an example balloon network may be adaptable. In particular, station-keeping functionality of example balloons may allow the balloons to adjust their respective positioning in accordance with a change in the desired topology of the network. For example, one or more balloons could move to new positions to increase or decrease the density of balloons in a given area. Other examples are possible.

In some embodiments, a balloon network 100 may employ an energy function to determine if and/or how balloons should move to provide a desired topology. In particular, the state of a given balloon and the states of some or all nearby balloons may be input to an energy function. The energy function may apply the current states of the given balloon and the nearby balloons to a desired network state (e.g., a state corresponding to the desired topology). A vector indicating a desired movement of the given balloon may then be determined by determining the gradient of the energy function. The given balloon may then determine appropriate actions to take in order to effectuate the desired movement. For example, a balloon may determine an altitude adjustment or adjustments such that winds will move the balloon in the desired manner.

2c) Control of Balloons in a Balloon Network

Figure 2:
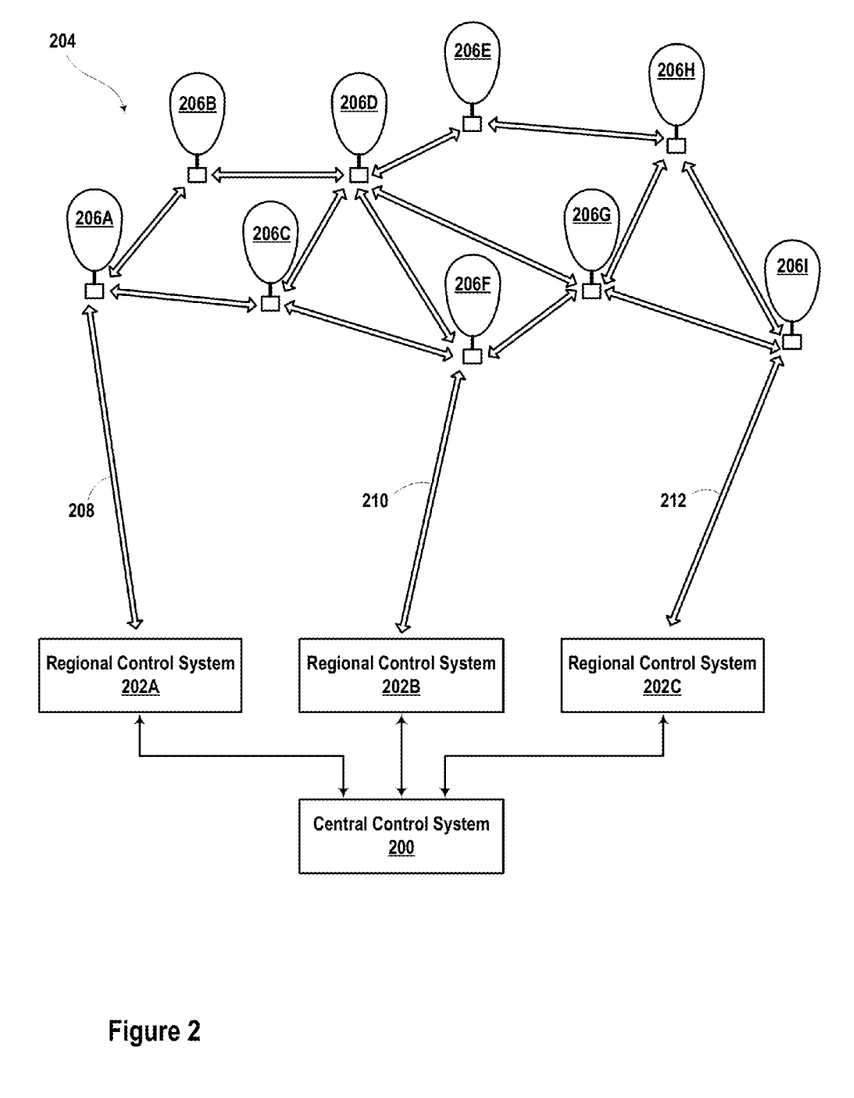
FIG. 2 is a block diagram illustrating a balloon-network control system, according to an example embodiment.

In some embodiments, mesh networking and/or station-keeping functions may be centralized. For example, FIG. 2 is a block diagram illustrating a balloon-network control system, according to an example embodiment. In particular, FIG. 2 shows a distributed control system, which includes a central control system 200 and a number of regional control-systems 202A to 202B. Such a control system may be configured to coordinate certain functionality for balloon network 204, and as such, may be configured to control and/or coordinate certain functions for balloons 206A to 206I.

In the illustrated embodiment, central control system 200 may be configured to communicate with balloons 206A to 206I via a number of regional control systems 202A to 202C. These regional control systems 202A to 202C may be configured to receive communications and/or aggregate data from balloons in the respective geographic areas that they cover, and to relay the communications and/or data to central control system 200. Further, regional control systems 202A to 202C may be configured to route communications from central control system 200 to the balloons in their respective geographic areas. For instance, as shown in FIG. 2, regional control system 202A may relay communications and/or data between balloons 206A to 206C and central control system 200, regional control system 202B may relay communications and/or data between balloons 206D to 206F and central control system 200, and regional control system 202C may relay communications and/or data between balloons 206G to 206I and central control system 200.

In order to facilitate communications between the central control system 200 and balloons 206A to 206I, certain balloons may be configured as downlink balloons, which are operable to communicate with regional control systems 202A to 202C. Accordingly, each regional control system 202A to 202C may be configured to communicate with the downlink balloon or balloons in the respective geographic area it covers. For example, in the illustrated embodiment, balloons 206A, 206F, and 206I are configured as downlink balloons. As such, regional control systems 202A to 202C may respectively communicate with balloons 206A, 206F, and 206I via optical links 206, 208, and 210, respectively.

In the illustrated configuration, only some of balloons 206A to 206I are configured as downlink balloons. The balloons 206A, 206F, and 206I that are configured as downlink balloons may relay communications from central control system 200 to other balloons in the balloon network, such as balloons 206B to 206E, 206G, and 206H. However, it should be understood that in some implementations, it is possible that all balloons may function as downlink balloons. Further, while FIG. 2 shows multiple balloons configured as downlink balloons, it is also possible for a balloon network to include only one downlink balloon, or possibly even no downlink balloons.

Note that a regional control system 202A to 202C may in fact just be a particular type of ground-based station that is configured to communicate with downlink balloons (e.g., such as ground-based station 112 of FIG. 1). Thus, while not shown in FIG. 2, a control system may be implemented in conjunction with other types of ground-based stations (e.g., access points, gateways, etc.).

In a centralized control arrangement, such as that shown in FIG. 2, the central control system 200 (and possibly regional control systems 202A to 202C as well) may coordinate certain mesh-networking functions for balloon network 204. For example, balloons 206A to 206I may send the central control system 200 certain state information, which the central control system 200 may utilize to determine the state of balloon network 204. The state information from a given balloon may include location data, optical-link information (e.g., the identity of other balloons with which the balloon has established an optical link, the bandwidth of the link, wavelength usage and/or availability on a link, etc.), wind data collected by the balloon, and/or other types of information. Accordingly, the central control system 200 may aggregate state information from some or all of the balloons 206A to 206I in order to determine an overall state of the network.

The overall state of the network may then be used to coordinate and/or facilitate certain mesh-networking functions such as determining lightpaths for connections. For example, the central control system 200 may determine a current topology based on the aggregate state information from some or all of the balloons 206A to 206I. The topology may provide a picture of the current optical links that are available in balloon network and/or the wavelength availability on the links. This topology may then be sent to some or all of the balloons so that a routing technique may be employed to select appropriate lightpaths (and possibly backup lightpaths) for communications through the balloon network 204.

In a further aspect, the central control system 200 (and possibly regional control systems 202A to 202C as well) may also coordinate certain station-keeping functions for balloon network 204. For example, the central control system 200 may input state information that is received from balloons 206A to 206I to an energy function, which may effectively compare the current topology of the network to a desired topology, and provide a vector indicating a direction of movement (if any) for each balloon, such that the balloons can move towards the desired topology. Further, the central control system 200 may use altitudinal wind data to determine respective altitude adjustments that may be initiated to achieve the movement towards the desired topology. The central control system 200 may provide and/or support other station-keeping functions as well.

FIG. 2 shows a distributed arrangement that provides centralized control, with regional control systems 202A to 202C coordinating communications between a central control system 200 and a balloon network 204. Such an arrangement may be useful to provide centralized control for a balloon network that covers a large geographic area. In some embodiments, a distributed arrangement may even support a global balloon network that provides coverage everywhere on earth. Of course, a distributed-control arrangement may be useful in other scenarios as well.

Further, it should be understood that other control-system arrangements are also possible. For instance, some implementations may involve a centralized control system with additional layers (e.g., sub-region systems within the regional control systems, and so on). Alternatively, control functions may be provided by a single, centralized, control system, which communicates directly with one or more downlink balloons.

In some embodiments, control and coordination of a balloon network may be shared by a ground-based control system and a balloon network to varying degrees, depending upon the implementation. In fact, in some embodiments, there may be no ground-based control systems. In such an embodiment, all network control and coordination functions may be implemented by the balloon network itself. For example, certain balloons may be configured to provide the same or similar functions as central control system 200 and/or regional control systems 202A to 202C. Other examples are also possible.

Furthermore, control and/or coordination of a balloon network may be de-centralized. For example, each balloon may relay state information to, and receive state information from, some or all nearby balloons. Further, each balloon may relay state information that it receives from a nearby balloon to some or all nearby balloons. When all balloons do so, each balloon may be able to individually determine the state of the network. Alternatively, certain balloons may be designated to aggregate state information for a given portion of the network. These balloons may then coordinate with one another to determine the overall state of the network.

Further, in some aspects, control of a balloon network may be partially or entirely localized, such that it is not dependent on the overall state of the network. For example, individual balloons may implement station-keeping functions that only consider nearby balloons. In particular, each balloon may implement an energy function that takes into account its own state and the states of nearby balloons. The energy function may be used to maintain and/or move to a desired position with respect to the nearby balloons, without necessarily considering the desired topology of the network as a whole. However, when each balloon implements such an energy function for station-keeping, the balloon network as a whole may maintain and/or move towards the desired topology.

As an example, each balloon A may receive distance information $d_1$ to $d_k$ with respect to each of its k closest neighbors. Each balloon A may treat the distance to each of the k balloons as a virtual spring with vector representing a force direction from the first nearest neighbor balloon i toward balloon A and with force magnitude proportional to $d_i$. The balloon A may sum each of the k vectors and the summed vector is the vector of desired movement for balloon A. Balloon A may attempt to achieve the desired movement by controlling its altitude.

Alternatively, this process could assign the force magnitude of each of these virtual forces equal to $d_i \times d_i$, for instance. Other algorithms for assigning force magnitudes for respective balloons in a mesh network are possible.

In another embodiment, a similar process could be carried out for each of the k balloons and each balloon could transmit its planned movement vector to its local neighbors. Further rounds of refinement to each balloon's planned movement vector can be made based on the corresponding planned movement vectors of its neighbors. It will be evident to those skilled in the art that other algorithms could be implemented in a balloon network in an effort to maintain a set of balloon spacings and/or a specific network capacity level over a given geographic location.

2d) Example Balloon Configuration

Figure 3:
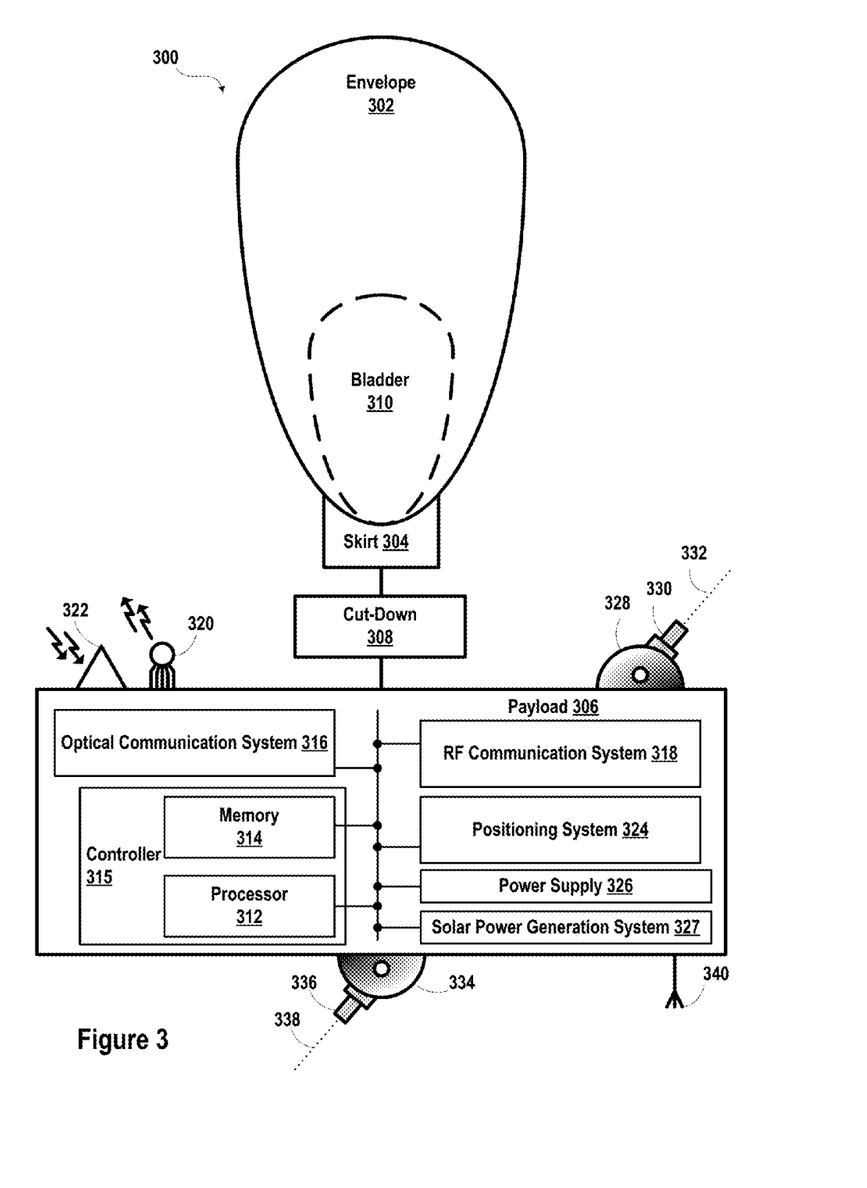
FIG. 3 is a simplified block diagram illustrating a high-altitude balloon, according to an example embodiment.

Various types of balloon systems may be incorporated in an example balloon network. As noted above, an example embodiment may utilize high-altitude balloons, which could typically operate in an altitude range between 17 km and 25 km. FIG. 3 shows a high-altitude balloon 300, according to an example embodiment. As shown, the balloon 300 includes an envelope 302, a skirt 304, a payload 306, and a cut-down system 308, which is attached between the envelope 302 and payload 304.

The envelope 302 and skirt 304 may take various forms, which may be currently well-known or yet to be developed. For instance, the envelope 302 and/or skirt 304 may be made of materials including metalized Mylar or BoPet. Additionally or alternatively, some or all of the envelope 302 and/or skirt 304 may be constructed from a highly-flexible latex material or a rubber material such as chloroprene. Other materials are also possible. Further, the shape and size of the envelope 302 and skirt 304 may vary depending upon the particular implementation. Additionally, the envelope 302 may be filled with various different types of gases, such as helium and/or hydrogen. Other types of gases are possible as well.

The payload 306 of balloon 300 may include a processor 312 and on-board data storage, such as memory 314. The memory 314 may take the form of or include a non-transitory computer-readable medium. The non-transitory computer-readable medium may have instructions stored thereon, which can be accessed and executed by the processor 312 in order to carry out the balloon functions described herein. Thus, processor 312, in conjunction with instructions stored in memory 314, and/or other components, may function as a controller 315 of balloon 300.

The payload 306 of balloon 300 may also include various other types of equipment and systems to provide a number of different functions. For example, payload 306 may include an optical communication system 316, which may transmit optical signals via an ultra-bright LED system 320, and which may receive optical signals via an optical-communication receiver 322 (e.g., a photodiode receiver system). Further, payload 306 may include an RF communication system 318, which may transmit and/or receive RF communications via an antenna system 340.

The payload 306 may also include a power supply 326 to supply power to the various components of balloon 300. The power supply 326 could include a rechargeable battery. In other embodiments, the power supply 326 may additionally or alternatively represent other means known in the art for producing power. In addition, the balloon 300 may include a solar power generation system 327. The solar power generation system 327 may include solar panels and could be used to generate power that charges and/or is distributed by the power supply 326.

The payload 306 may additionally include a positioning system 324. The positioning system 324 could include, for example, a global positioning system (GPS), an inertial navigation system, and/or a star-tracking system. The positioning system 324 may additionally or alternatively include various motion sensors (e.g., accelerometers, magnetometers, gyroscopes, and/or compasses).

The positioning system 324 may additionally or alternatively include one or more video and/or still cameras, and/or various sensors for capturing environmental data.

Some or all of the components and systems within payload 306 may be implemented in a radiosonde or other probe, which may be operable to measure, e.g., pressure, altitude, geographical position (latitude and longitude), temperature, relative humidity, and/or wind speed and/or wind direction, among other information.

As noted, balloon 300 includes an ultra-bright LED system 320 for free-space optical communication with other balloons. As such, optical communication system 316 may be configured to transmit a free-space optical signal by modulating the ultra-bright LED system 320. The optical communication system 316 may be implemented with mechanical systems and/or with hardware, firmware, and/or software. Generally, the manner in which an optical communication system is implemented may vary, depending upon the particular application. The optical communication system 316 and other associated components are described in further detail below.

In a further aspect, balloon 300 may be configured for altitude control. For instance, balloon 300 may include a variable buoyancy system, which is configured to change the altitude of the balloon 300 by adjusting the volume and/or density of the gas in the balloon 300. A variable buoyancy system may take various forms, and may generally be any system that can change the volume and/or density of gas in the envelope 302.

In an example embodiment, a variable buoyancy system may include a bladder 310 that is located inside of envelope 302. The bladder 310 could be an elastic chamber configured to hold liquid and/or gas. Alternatively, the bladder 310 need not be inside the envelope 302. For instance, the bladder 310 could be a rigid bladder that could be pressurized well beyond neutral pressure. The buoyancy of the balloon 300 may therefore be adjusted by changing the density and/or volume of the gas in bladder 310. To change the density in bladder 310, balloon 300 may be configured with systems and/or mechanisms for heating and/or cooling the gas in bladder 310. Further, to change the volume, balloon 300 may include pumps or other features for adding gas to and/or removing gas from bladder 310. Additionally or alternatively, to change the volume of bladder 310, balloon 300 may include release valves or other features that are controllable to allow gas to escape from bladder 310. Multiple bladders 310 could be implemented within the scope of this disclosure. For instance, multiple bladders could be used to improve balloon stability.

In an example embodiment, the envelope 302 could be filled with helium, hydrogen or other lighter-than-air material. The envelope 302 could thus have an associated upward buoyancy force. In such an embodiment, air in the bladder 310 could be considered a ballast tank that may have an associated downward ballast force. In another example embodiment, the amount of air in the bladder 310 could be changed by pumping air (e.g., with an air compressor) into and out of the bladder 310. By adjusting the amount of air in the bladder 310, the ballast force may be controlled. In some embodiments, the ballast force may be used, in part, to counteract the buoyancy force and/or to provide altitude stability.

In other embodiments, the envelope 302 could be substantially rigid and include an enclosed volume. Air could be evacuated from envelope 302 while the enclosed volume is substantially maintained. In other words, at least a partial vacuum could be created and maintained within the enclosed volume. Thus, the envelope 302 and the enclosed volume could become lighter than air and provide a buoyancy force. In yet other embodiments, air or another material could be controllably introduced into the partial vacuum of the enclosed volume in an effort to adjust the overall buoyancy force and/or to provide altitude control.

In another embodiment, a portion of the envelope 302 could be a first color (e.g., black) and/or a first material from the rest of envelope 302, which may have a second color (e.g., white) and/or a second material. For instance, the first color and/or first material could be configured to absorb a relatively larger amount of solar energy than the second color and/or second material. Thus, rotating the balloon such that the first material is facing the sun may act to heat the envelope 302 as well as the gas inside the envelope 302. In this way, the buoyancy force of the envelope 302 may increase. By rotating the balloon such that the second material is facing the sun, the temperature of gas inside the envelope 302 may decrease. Accordingly, the buoyancy force may decrease. In this manner, the buoyancy force of the balloon could be adjusted by changing the temperature/volume of gas inside the envelope 302 using solar energy. In such embodiments, it is possible that a bladder 310 may not be a necessary element of balloon 300. Thus, in various contemplated embodiments, altitude control of balloon 300 could be achieved, at least in part, by adjusting the rotation of the balloon with respect to the sun.

Further, a balloon 306 may include a navigation system (not shown). The navigation system may implement station-keeping functions to maintain position within and/or move to a position in accordance with a desired topology. In particular, the navigation system may use altitudinal wind data to determine altitudinal adjustments that result in the wind carrying the balloon in a desired direction and/or to a desired location. The altitude-control system may then make adjustments to the density of the balloon chamber in order to effectuate the determined altitudinal adjustments and cause the balloon to move laterally to the desired direction and/or to the desired location. Alternatively, the altitudinal adjustments may be computed by a ground-based or satellite-based control system and communicated to the high-altitude balloon. In other embodiments, specific balloons in a heterogeneous balloon network may be configured to compute altitudinal adjustments for other balloons and transmit the adjustment commands to those other balloons.

As shown, the balloon 300 also includes a cut-down system 308. The cut-down system 308 may be activated to separate the payload 306 from the rest of balloon 300. The cut-down system 308 could include at least a connector, such as a balloon cord, connecting the payload 306 to the envelope 302 and a means for severing the connector (e.g., a shearing mechanism or an explosive bolt). In an example embodiment, the balloon cord, which may be nylon, is wrapped with a nichrome wire. A current could be passed through the nichrome wire to heat it and melt the cord, cutting the payload 306 away from the envelope 302.

The cut-down functionality may be utilized anytime the payload needs to be accessed on the ground, such as when it is time to remove balloon 300 from a balloon network, when maintenance is due on systems within payload 306, and/or when power supply 326 needs to be recharged or replaced.

In an alternative arrangement, a balloon may not include a cut-down system. In such an arrangement, the navigation system may be operable to navigate the balloon to a landing location, in the event the balloon needs to be removed from the network and/or accessed on the ground. Further, it is possible that a balloon may be self-sustaining, such that it does not need to be accessed on the ground. In yet other embodiments, in-flight balloons may be serviced by specific service balloons or another type of service aerostat or service aircraft.

3. Example Devices and Systems

Figure 4A:
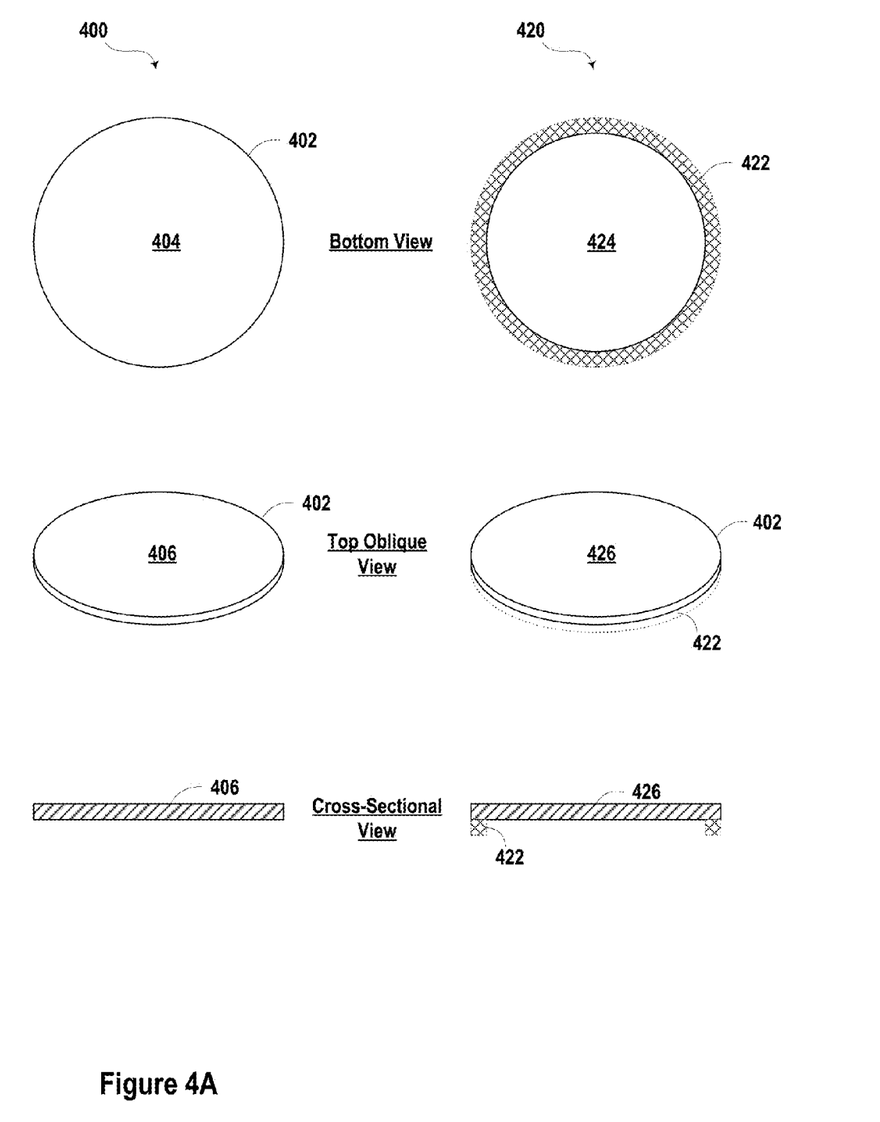
FIG. 4A illustrates several thermal management devices, according to example embodiments.

FIG. 4A illustrates several thermal management devices 400 and 420, according to example embodiments. For example, thermal management device 400 may include an outer edge 402, a bottom side 404, and a top side 406.

In another embodiment, thermal management device 420 may include a protrusion 422. The protrusion 422 could extend away from the bottom side 424 near the outer edge 402. The protrusion 422 could extend at least 1" from the bottom side 424, however other extension lengths are possible.

Figure 4B:
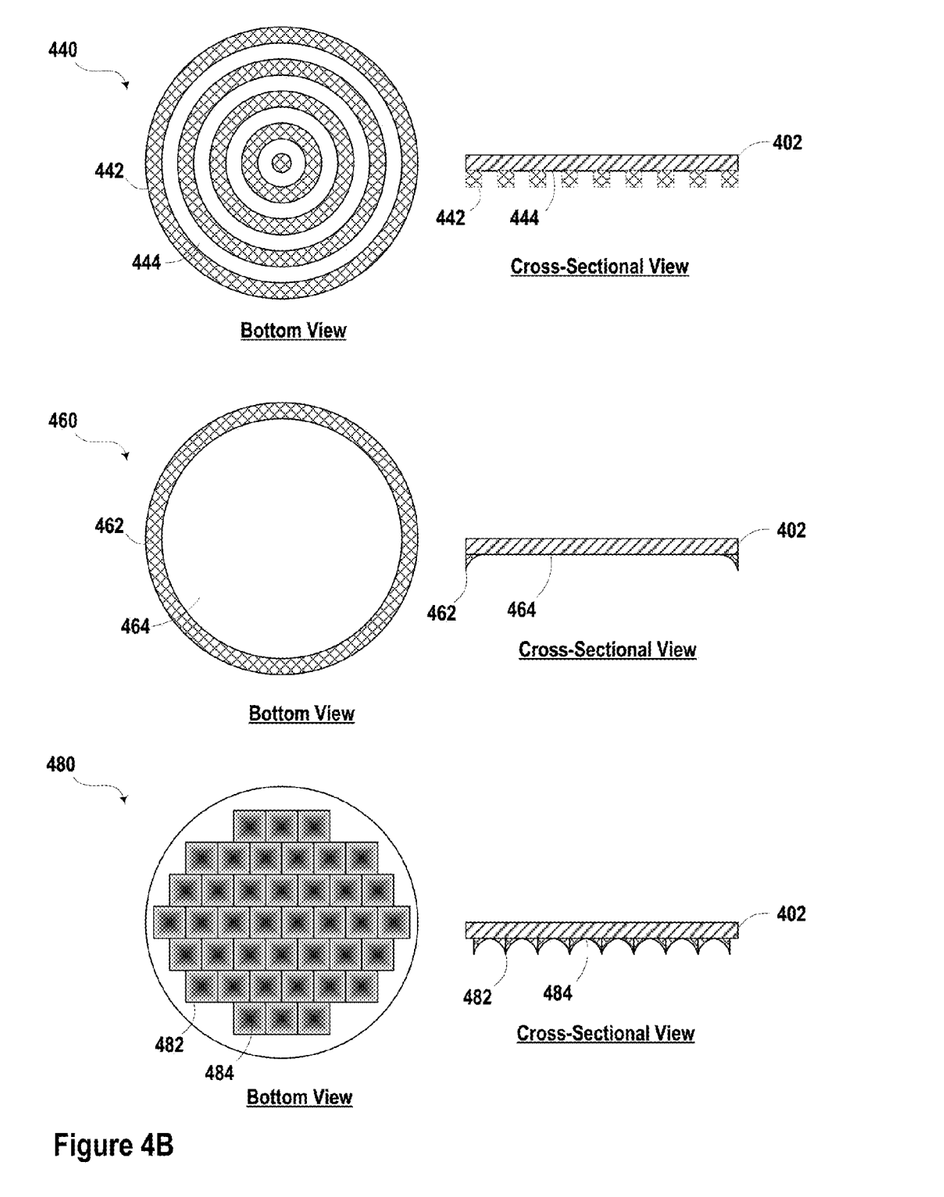
FIG. 4B illustrates several thermal management devices, according to example embodiments.

FIG. 4B illustrates thermal management devices 440, 460, and 480, according to example embodiments. Thermal management device 440 may include a plurality of protrusions 442 that extend away from the bottom side of the thermal management device 440. In an example embodiment, the plurality of protrusions 442 may be arranged so as to form slots 444 with varying radii. Namely, the slots 444 may be rotationally symmetric about a central vertical axis of the thermal management device 440.

Thermal management device 460 may include protrusion 462, which may be arranged similar to protrusion 422 illustrated and described with reference to FIG. 4A. However, the protrusion 462 may have a different cross-sectional shape. Namely, protrusion 462 may include a rounded or concave cross-sectional shape. Other cross-sectional shapes for protrusion 462 are possible.

Thermal management device 480 may include a plurality of protrusions 482, which may form a corresponding plurality of dimples 484.

Figure 4C:
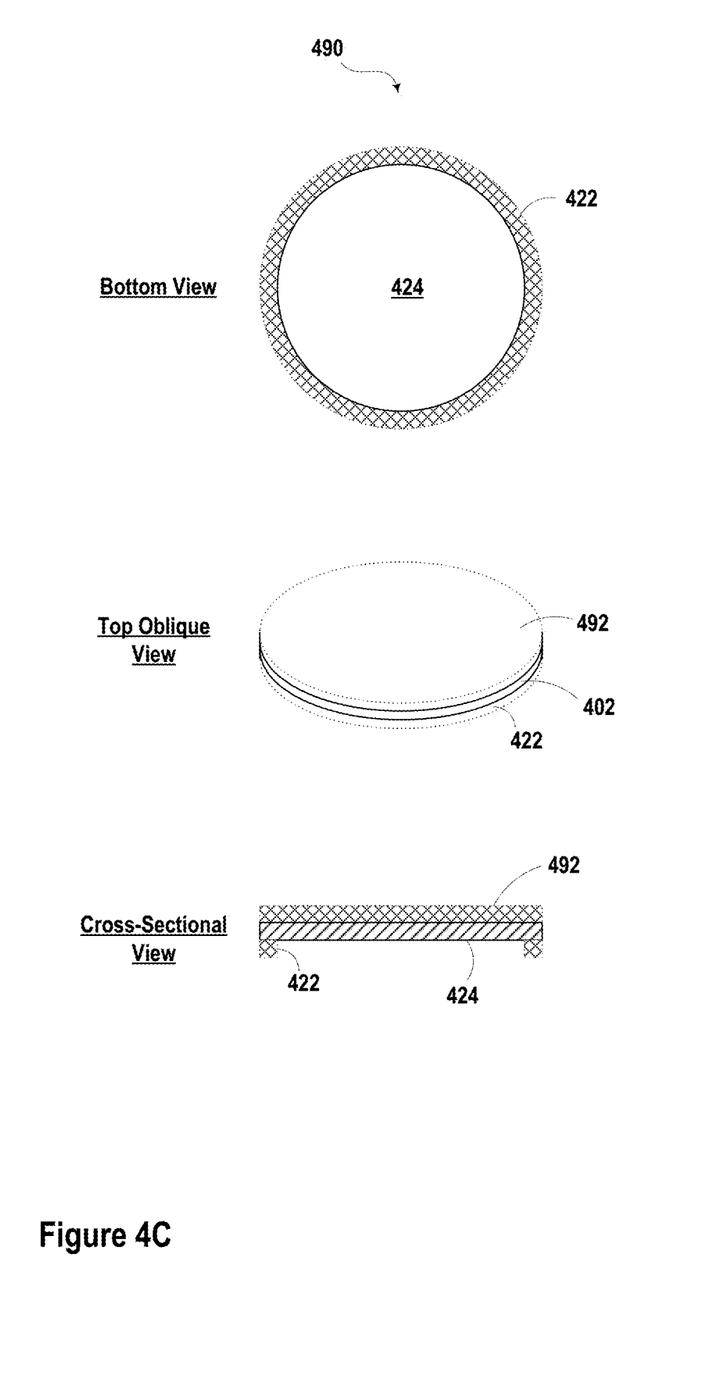
FIG. 4C illustrates a thermal management device, according to an example embodiment.

FIG. 4C illustrates a thermal management device 490 according to an example embodiment. Thermal management device 490 includes a thermally-insulating material 492 on a top side of the thermal management device 490. A low emissivity material may coat at least a portion of a topmost surface of the thermally-insulating material 492.

Any of the thermal management devices 400, 420, 440, 460, 480, or 490 illustrated and described in reference to FIG. 4A, 4B, or 4C may include a high emissivity material. The high emissivity material may be disposed on at least a portion of a bottom side of the thermal management device (e.g. bottom side 404). The high emissivity material may be configured to absorb electromagnetic radiation in a thermal infrared spectrum. The high emissivity material may include a selective black coating, a second surface mirror, a clear anodized coating, or white paint. Other materials configured to have a high emissivity with respect to wavelengths of electromagnetic radiation in a thermal infrared spectrum are contemplated herein.

Any of the thermal management devices 400, 420, 440, 460, 480, or 490 illustrated and described in reference to FIG. 4A, 4B, or 4C may be arrangeable on a surface of a component of a stratospheric balloon or another type of high-altitude aerial vehicle. For example, the thermal management device may be thermally and/or physically-coupled to the component of the stratospheric balloon. The component of the stratospheric balloon may include a portion of a radio transceiver, such as a radio transmitter amplifier or an antenna. Additionally or alternatively, the component of the stratospheric balloon may be a different component or a plurality of components of the balloon. For example, the thermal management device may be thermally coupled to any portion of the balloon or the entire payload of the balloon. Yet further, a plurality of thermal management devices may be coupled to a corresponding plurality of components of the stratospheric balloon.

As shown in FIGS. 4A and 4B, the thermal management devices 400, 420, 440, 460, 480, or 490 illustrated and described in reference to FIG. 4A, 4B, or 4C may include a shape similar or identical to a circular disk. In an example embodiment, a diameter of the thermal management device 400 may be 400 mm with a thickness of 1.25 mm. Alternatively, the thermal management device 400 may include a different diameter and/or thickness.

Alternatively, the thermal management devices 400, 420, 440, 460, 480, or 490 illustrated and described in reference to FIG. 4A, 4B, or 4C may have another shape, such as a square, a rectangle, an oval. Furthermore, the shape of the thermal management devices need not be substantially two-dimensional. For example, the thermal management device may be shaped like a sphere, a half sphere, a cube, or another substantially three-dimensional form. Additionally or alternatively, the thermal management devices 400, 420, 440, 460, 480, and 490 may be shaped to encapsulate, conform to, or couple with a temperature-sensitive device, as described below.

Furthermore, the thermal management devices described herein may be sized and/or shaped based on the temperature-sensitive device. For example, the thermal management device may be sized and/or shaped based on a known heating load and/or cooling load and with respect to the target temperature range. For example, the thermal management device may be sized based on a power consumption of the temperature-sensitive device and/or the time of day during which the temperature-sensitive device will be in operation. In such a scenario, heat dissipation may scale linearly with the area of the thermal management device.

Specifically, in the case where a temperature-sensitive device produces excess heat during both day and night operations, the thermal management device may be sized/ shaped such that the thermal management device is operable similar to a heat sink. Conversely, in the case where a temperature-sensitive device does not produce excess heat during either day or night operations, the thermal management device may be sized/shaped such that the thermal management device is operable similar to a passive heater. Other considerations and scenarios may form the basis for the size, shape, arrangement, and material composition of the thermal management device.

During flight, the top side of the thermal management device may face substantially upward with respect to ground. Correspondingly, the bottom side of the thermal management device may face substantially downward with respect to the ground.

As described above, the bottom side of the thermal management device may be shaped so as to retain air that is warmer than an ambient air temperature at a stratospheric altitude. As such, the thermal management device may include a surface that extends substantially horizontally with respect to the ground so as to reduce or minimize convection of warm air from the underside of the thermal management device. Additionally or alternatively, the shape of the bottom side of the thermal management may include at least one protrusion. The protrusion(s) may extend downward from the bottom side of the thermal management device.

The at least one protrusion may include a thermally-insulating material. The thermally-insulating material may include, but is not limited to: polystyrene, fiberglass, urethane, cellulose, cork, plastic, ceramic, insulating paint, silica fiber, carbon fiber. In an example embodiment, the at least one protrusion extends downward from the second side at least 1 inch. In such a scenario, the protrusion may form a downward-protruding rim on the bottom side and about the outer edge of the thermal management device.

Other arrangements of the at least one protrusion are contemplated. For example, the at least one protrusion may extend away from the bottom side of the thermal management device so as to form pockets, crevices, spaces, slots, or dimples, which may be configured to trap or retain warm air. Specifically, instead of warm air moving upwards (and away from) the thermal management device, the at least one protrusion and corresponding pockets may be configured to reduce or minimize loss of the warm air from the underside of the thermal management device.

In an example embodiment, the thermal management device may include thermally-insulating material in various locations. For example, thermally-insulating material may be applied onto and/or incorporated into the top side of the thermal management device. Thermally-insulating material may be included in other locations of the thermal management device.

In an example embodiment, the thermal management device may include a thermally conductive material. For example, the thermally conductive material may include a metal, such as aluminum, copper, silver, or steel. Alternatively or additionally, the thermal management device may include other materials, such as carbon fiber, thermal pyrolytic graphite, graphene, silicon, diamond, and/or ceramic materials.

In an example embodiment, the top side of the thermal management device may include a polished surface of the thermally conductive material. Additionally or alternatively, the top side of the thermal management device may include metallized Mylar, metallized boPET, or metallized foil tape.

In an example embodiment, the thermal management device may include an aluminum disk. In such a scenario, the top side of the thermal management device may include a polished aluminum surface configured to substantially reflect electromagnetic radiation in the thermal infrared spectrum. The bottom side of the thermal management device may include the high emissivity material, which may include a coating of white paint.

Figure 5:
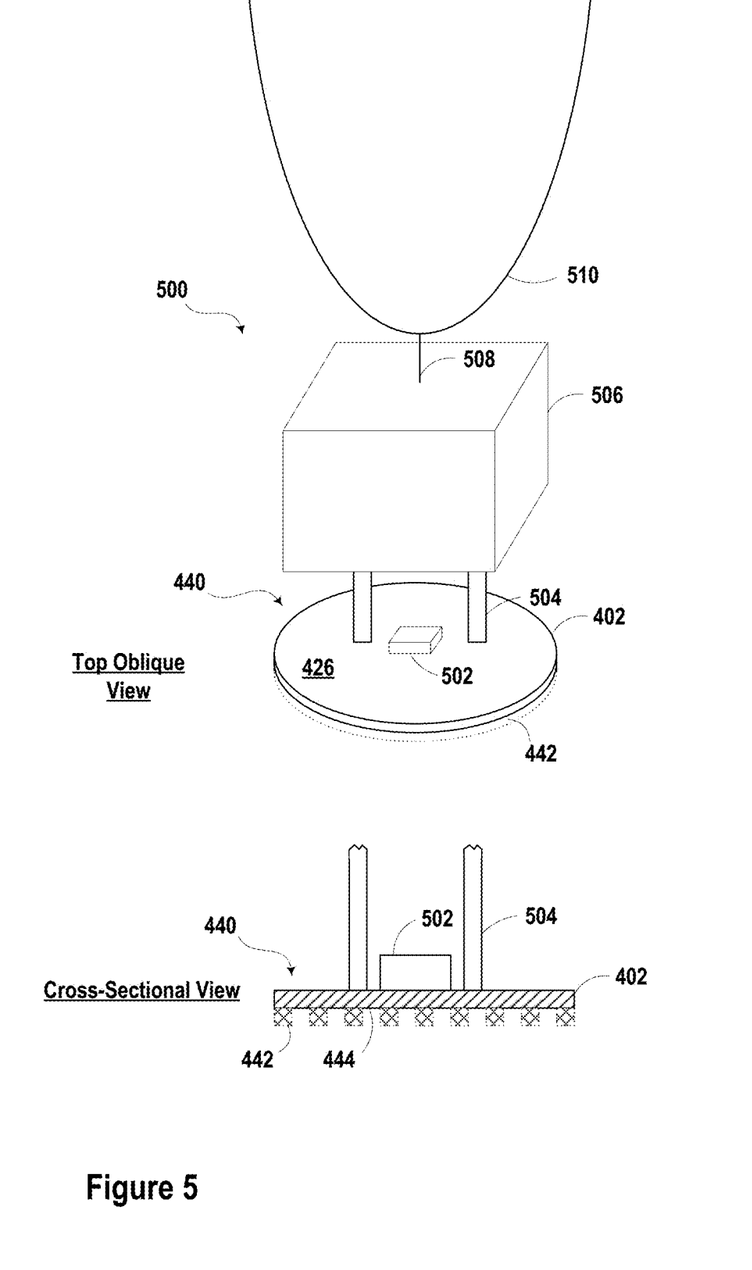
FIG. 5 illustrates a system, according to an example embodiment.

FIG. 5 illustrates a system 500, according to an example embodiment. The system 500 may include a thermal management device, such as thermal management device 440 illustrated and described in reference to FIG. 4B. System 500 may additionally or alternatively include any other thermal management device described herein. The thermal management device may be coupled to a temperature-sensitive device 502.

The temperature-sensitive device 502 may be a component of a stratospheric balloon, such as balloon 300 illustrated and described in reference to FIG. 3. For example, the temperature-sensitive device 502 may include a radio transmitter, a radio transceiver, an antenna, a low-noise amplifier, a power amplifier, a solar panel power conversion device, a battery, a computer, or any other temperature-sensitive component of the stratospheric balloon. The temperature-sensitive device 502 may be configured to operate within a target temperature range.

In an example embodiment, the target temperature range could be a standard industrial temperature specification of −40° C. to 100° C. Other temperature specification ranges are possible, such as military (e.g. MIL-STD-810G, −55° C. to 125° C.), commercial (0° C. to 85° C.), or extended (−40° C. to 125° C.) temperature ranges. The target temperature range may be based on a device operating temperature range. The target temperature range may be additionally or alternatively based on an effort to maintain device performance over a predefined target lifetime of the device, which may include a predetermined number of weeks, months, and/or years.

The thermal management device may be coupled to a balloon payload 506 via one or more supports 504. The one or more supports 504 may include fiberglass or another thermally insulating material. As shown, the one or more supports 504 extend from a bottom side of the payload 506 to the thermal management device. However, the supports 504 and the thermal management device may be arranged in a manner other than illustrated in FIG. 5. For example, the one or more supports 504 may extend from a side of the payload 506. Alternatively or additionally, the one or more supports 504 may extend from a top side of the payload 506, from one or more flying wires 508, or from the balloon envelope 510.

Alternatively, the one or more supports 504 need not be included in system 500. In such a scenario, the thermal management device may be arranged adjacent to, or surrounding, any temperature-sensitive device or any component of the balloon.

As described elsewhere, the thermal management device may be arranged along a surface of the temperature-sensitive device 502 such that it is thermally coupled to the temperature-sensitive device 502. Although FIG. 5 illustrates temperature-sensitive device 502 as being arranged along a top side of the thermal management device, in some embodiments the temperature-sensitive device 502 may be arranged along a bottom side of the thermal management device. Other arrangements are possible.

In other embodiments, the thermal management device may be incorporated into at least a portion of the temperature-sensitive device 502. For example, the temperature-sensitive device 502 may include a disk-shaped 700 MHz antenna. In such a scenario, the thermal management device may include a high emissivity material on the bottom side of the disk-shaped antenna and a low emissivity material or a polished metal surface on the top side of the disk-shaped antenna.

Additionally or alternatively, the temperature-sensitive device 502 may be incorporated into at least a portion of the thermal management device. For example, the thermal management device may be shaped such that the temperature-sensitive device 502 is encapsulated or otherwise incorporated within at least a portion of the thermal management device. In such a scenario, the thermal management device may be shaped substantially like a half-sphere, with the bottom, flat surface of the thermal management device facing downward. The temperature-sensitive device 502 could be disposed inside the half-sphere of the thermal management device. Other arrangements of the temperature-sensitive device 502 and the thermal management device are possible and such arrangements are contemplated herein.

As described elsewhere herein, a bottom side of the thermal management device may be shaped to retain warm air that is warmer than an ambient air temperature at a stratospheric altitude. For example, the shape of the bottom side may include at least one protrusion. The at least one protrusion may be shaped such that the bottom side of the thermal management device includes dimples, pockets, slots, or other spaces configured to retain and/or trap the warm air. The at least one protrusion may include a thermally insulating material.

In an example embodiment, the at least one protrusion may include a rim extending outward from the bottom side of the thermal management device. The rim may be disposed about an outer edge of the bottom side. In an example embodiment, the rim may extend outward from the second side at least 1 inch. Other arrangements of the at least one protrusion are possible and contemplated herein.

By absorbing electromagnetic radiation in the thermal infrared spectrum, the temperature of the thermal management device may become closer to the Earth's blackbody temperature. Furthermore, by shaping the thermal management device to prevent warm air from rising from underneath the thermal management device, the temperature of the thermal management device may be higher than it might be without such a shape.

Thus, while thermally coupled to the temperature-sensitive device 502, the thermal management device may be operable to heat and cool the temperature-sensitive device 502 such that the temperature-sensitive device operates within the target temperature range.

At altitudes above 10 km, the downward-facing infrared temperature may typically be ~40° C. higher than the local air temperature. The disclosed systems and devices take advantage of this non-equilibrium condition by preferentially absorbing thermal infrared radiation from downward-facing surfaces. Furthermore, at such altitudes, the dominant energy exchange mechanism may conform to the Stefan-Boltzmann law, which describes the power radiated from a blackbody based on the blackbody's temperature. The Stefan-Boltzmann law states that the power radiated from a blackbody is proportional to its absolute temperature to the fourth power. For example, the surface temperature rise for a given amount of added power from a surface temperature of −50° C. will be significantly more than at a surface temperature of 50° C. Therefore, the disclosed systems and devices may take advantage of this nonlinearity condition based on the temperature differential between the Earth and the stratospheric body, e.g. the high-altitude aerial vehicle or balloon.

In an example scenario, at least some of the electromagnetic radiation, principally emitted from the Earth or another electromagnetic emission source, may be absorbed by the high emissivity material on the bottom side of the thermal management device. The absorbed electromagnetic radiation may increase the temperature of the thermal management device. As such, the temperature of the thermal management device may become more like the temperature of the blackbody emission source as compared to an ambient air equilibrium temperature around the thermal management device.

The above detailed description describes various features and functions of the disclosed systems, devices, and methods with reference to the accompanying figures. While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A thermal management device comprising:
   a first side;
   a second side; and
   a high emissivity material disposed on at least a portion of the second side, wherein the high emissivity material is configured to have a high emissivity with respect to wavelengths of electromagnetic radiation in a thermal infrared spectrum,
   wherein the thermal management device is arrangeable on a surface of a component of a stratospheric aerial vehicle,
   wherein the thermal management device is coupled to a balloon payload of the stratospheric aerial vehicle,
   wherein the balloon payload of the stratospheric aerial vehicle is coupled to a balloon envelope of the stratospheric aerial vehicle via one or more flying wires,
   wherein the thermal management device is configured such that when arranged on the component of the stratospheric aerial vehicle during flight, the first side faces substantially upward with respect to ground, and the second side faces substantially downward with respect to the ground, and
   wherein the second side is shaped to retain air that is warmer than an ambient air temperature at a stratospheric altitude.

2. The thermal management device of claim 1, further comprising a thermally conductive material.

3. The thermal management device of claim 2, wherein the first side comprises a polished surface of the thermally conductive material.

4. The thermal management device of claim 1, wherein the first side comprises at least one of: metallized Mylar, metallized boPET, or metallized foil tape.

5. The thermal management device of claim 1, wherein the thermal management device is thermally coupled to the component of the stratospheric aerial vehicle.

6. The thermal management device of claim 1, wherein the shape of the second side comprises at least one protrusion, wherein the at least one protrusion extends downward from the second side,
   wherein the at least one protrusion comprises a thermally-insulating material,
   wherein the at least one protrusion extends downward from the second side at least 1 inch, and wherein the at least one protrusion comprises a downward-protruding rim disposed about an outer edge of the second side.

7. The thermal management device of claim 6, wherein the at least one protrusion is shaped such that the bottom side of the second side includes dimples configured to retain the air that is warmer than the ambient air temperature at the stratospheric altitude.

8. The thermal management device of claim 1, further comprising a surface that extends substantially horizontally with respect to the ground to reduce convection of warm air from an underside of the thermal management device.

9. The thermal management device of claim 1, further comprising an aluminum disk, wherein the first side comprises a first surface of the aluminum disk, wherein the second side comprises a second surface of the aluminum disk, and wherein the high emissivity material comprises white paint disposed on the second side.

10. The thermal management device of claim 1, wherein the high emissivity material comprises at least one of: a selective black coating, a second surface mirror, or a clear anodized coating on the second side.

11. A system comprising:
a temperature-sensitive device configured to operate within a target temperature range, wherein the temperature-sensitive device comprises a component of a stratospheric aerial vehicle;
a thermal management device arranged on a surface of the temperature-sensitive device such that the thermal management device thermally couples to the temperature-sensitive device, wherein the thermal management device comprises a first side and a second side, wherein the first side faces substantially upward with respect to ground, and the second side faces substantially downward with respect to the ground, wherein the thermal management device comprises a high emissivity material disposed on at least a portion of the second side, wherein the high emissivity material is configured to have a high emissivity with respect to wavelengths of electromagnetic radiation in a thermal infrared spectrum, and wherein the second side is shaped to retain warm air that is warmer than an ambient air temperature at a stratospheric altitude, such that the thermal management device is configured to heat and cool the temperature-sensitive device such that the temperature-sensitive device operates within a target temperature range;
a balloon envelope; and
a balloon payload,
wherein the balloon payload is coupled to the balloon envelope via one or more flying wires, and
wherein the balloon payload is coupled to the surface of the thermal management device.

12. The system of claim 11, wherein the balloon payload is coupled to the surface of the thermal management device via one or more supports.

13. The system of claim 11, wherein the thermal management device further comprises a thermally conductive material.

14. The system of claim 13, wherein the first side comprises a polished surface of the thermally conductive material.

15. The system of claim 11, wherein the first side comprises at least one of: metallized Mylar, metallized boPET, or metallized foil tape.

16. The system of claim 11, wherein the shape of the second side comprises at least one protrusion, wherein the at least one protrusion is shaped so as to retain the warm air.

17. The system of claim 16, wherein the at least one protrusion comprises a thermally-insulating material, wherein the at least one protrusion comprises a rim extending outward from the second side and disposed about an outer edge of the second side, and wherein the at least one protrusion extends outward from the second side at least 1 inch.

18. The system of claim 11, wherein at least one dimension of the thermal management device is based on at least one characteristic of the temperature-sensitive device.

19. The system of claim 18, wherein the at least one dimension comprises an area of at least one side of the thermal management device.

20. The system of claim 18, wherein the at least one characteristic comprises a power dissipated during operation of the temperature-sensitive device.

* * * * *